United States Patent
Tang et al.

(12) 
(10) Patent No.: US 6,651,623 B1
(45) Date of Patent: Nov. 25, 2003

(54) METHOD AND SYSTEM FOR MEASURING AIR/FUEL RATIO IN A HYDROGEN FUELED INTERNAL COMBUSTION ENGINE

(75) Inventors: Xiaoguo Tang, Canton, MI (US); Siamak Hashemi, Farmington Hills, MI (US); Allan Joseph Kotwicki, Williamsburg, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,638

(22) Filed: Aug. 1, 2002

(51) Int. Cl.[7] .................................................. F02P 5/00
(52) U.S. Cl. ............. 123/406.23; 123/676; 123/568.21; 123/690
(58) Field of Search .................. 123/399, 676, 123/406.23, 568.21, 690, DIG. 12

(56) References Cited

U.S. PATENT DOCUMENTS

| | | | | |
|---|---|---|---|---|
| 3,910,037 A | * | 10/1975 | Salkeld ......................... | 60/250 |
| 3,982,591 A | * | 9/1976 | Hamrick et al. ............. | 166/302 |
| 4,901,525 A | * | 2/1990 | Beveridge et al. ............ | 60/211 |
| 5,558,783 A | * | 9/1996 | McGuinness ................ | 210/761 |
| 5,707,593 A | * | 1/1998 | Wang .......................... | 422/171 |
| 6,000,384 A | | 12/1999 | Brown et al. | |
| 6,427,639 B1 | * | 8/2002 | Andrews et al. ................ | 123/3 |

* cited by examiner

Primary Examiner—John Kwon
(74) Attorney, Agent, or Firm—Diana D. Brehob

(57) ABSTRACT

A method and system for computing fuel-to-air ratio for a hydrogen-fueled engine is disclosed. The fuel-to-air ratio is determined based on a signal from an exhaust gas temperature sensor.

34 Claims, 2 Drawing Sheets

METHOD AND SYSTEM FOR MEASURING AIR/FUEL RATIO IN A HYDROGEN FUELED INTERNAL COMBUSTION ENGINE

BACKGROUND OF THE INVENTION

Field of the Invention

This invention relates generally to methods and systems for measuring air-fuel ratios and more particularly to methods and systems for measuring air-fuel ratios in hydrogen fueled internal combustion engines.

BACKGROUND AND SUMMARY OF THE INVENTION

As is known in the art, it is frequently required to measure the air-fuel ratio in internal combustion engines. In gasoline-fueled engines, it is common practice to employ an Exhaust Gas Oxygen (EGO) sensor to measure the fuel-to-air ratio. The EGO sensor is disposed in the exhaust gas flow produced by the engine. The EGO sensor is well developed for use in engines that operate at a stoichiometric proportion of fuel to air, i.e., a proportion at which the fuel and the oxygen in the air would be completely consumed if the reaction went to completion.

As is also known in the art, excess air combustion potentially provides higher fuel efficiency than stoichiometric combustion. However, for lean mixtures, a conventional EGO sensor provides limited information. In the lean case, a wide range or Universal EGO (UEGO) sensor is used instead of an EGO sensor. UEGO sensors are capable of measuring fuel-to-air ratio for rich (excess fuel) and lean mixtures as well as stoichiometric mixtures. One disadvantage is that a UEGO sensor is more costly, and less well developed, than the conventional EGO sensor.

As is also known, both EGO and UEGO sensors have a precious metal coating on the sensor surface exposed to the exhaust gas stream. A catalytic reaction occurs on the surface of the sensor causing excess fuel to react with excess oxygen. It is well known in the art that combustion efficiency in a stoichiometric gasoline engine, for example, is less than 100%, typically 97%. Thus, the gases emanating from the engine contain some unburned fuel and oxygen. Depending on the stoichiometry of the exhaust gases, one or the other of the fuel or oxygen is depleted prior to the other. An EGO sensor provides a signal essentially indicating whether there is excess fuel or excess oxygen existing in the exhaust gases after the reaction on the surface of the sensor. A UEGO sensor provides a signal proportional to the amount of excess fuel or excess oxygen.

As is also known in the art, a fuel, which combusts at extremely lean fuel-to-air ratios, and thus delivers high fuel efficiency, is hydrogen. A well-known issue using an EGO sensor or UEGO sensor to determine fuel-to-air ratio from hydrogen combustion is that a biased measurement is produced due to the unequal diffusion rates of hydrogen compared to other species in the exhaust. More particularly, hydrogen, being an extremely small molecule, diffuses more readily than other constituents (i.e., $N_2$, $O_2$, and $H_2O$) also in the exhaust gases. Thus, at the precious metal surface of an EGO or UEGO sensor, unburned hydrogen is catalytically reacted with oxygen, thereby depleting the hydrogen in the exhaust in the vicinity of the EGO or UEGO sensor, while also diminishing the quantity of oxygen in such exhaust. The lower concentration of these two species occurring at the sensor surface compared to the bulk gas concentration causes diffusion of $H_2$ and $O_2$ from the bulk gas toward the sensor surface. due to its high diffusivity, arrives at the surface more rapidly than $O_2$, thereby biasing the EGO or UEGO signal. More particularly, the effect is that the EGO or UEGO sensor indicates a richer mixture than what actually exists in the bulk exhaust gases.

The inventors of the present invention have recognized a need for an inexpensive and reliable alternative to an EGO or UEGO sensor for measuring fuel-to-air ratio in a lean-burning, hydrogen-fueled engine.

In accordance with the present invention, a method is provided wherein hydrogen is introduced into an internal combustion engine along with an oxidizer. The hydrogen and the oxidizer are combusted in the internal combustion engine with products of such combustion being removed from the engine as an exhaust gas stream. The method determines the mass ratio based on said temperature independent of engine operating power.

Thus, the inventors have discovered that while engine power along with temperature may be used to determine the air-fuel ratio with a gasoline fueled engine, with a hydrogen fuel engine, the oxidizer-hydrogen ratio may be determined independent of engine operating power.

More particularly, while the relationship between exhaust temperature and stoichiometry has been exploited previously in gasoline powered aircraft and racing applications, the inventors have discovered that with a hydrogen fuel engine, the oxidizer-hydrogen ratio may be determined independent of engine operating power. In the prior art, the fuel-to-air ratio is manually adjusted until the exhaust temperature is at a maximum. Then, the fuel-to-air ratio is increased (made richer). The purpose of increasing the fuel-to-air ratio beyond the stoichiometric ratio is to avoid overheating exhaust valves. Essentially, the fuel provides a cooling effect. The method, according to the present invention, is different than prior uses for a number of reasons. Firstly, the present method applies to hydrogen fuel only because of the unique relationship between stoichiometry and exhaust temperature recognized by the inventors of the present invention. Specifically, the fuel-to-air ratio to exhaust temperature relationship does not depend on engine speed, engine torque, or the product of the two, engine power, for hydrogen fuel. Secondly, because there is a unique relationship between exhaust temperature and stoichiometry for hydrogen fuel combustion, the present invention relies on the relationship to provide a measure of fuel-to-air ratio, as opposed to prior methods which use temperature only in a relative sense to determine an operating condition rich of stoichiometric which is not deleterious to the engine components.

Other disadvantages of prior methods are overcome by a method for determining a mass ratio of a fuel to an oxidizer being combusted in an internal combustion engine including the steps of determining the temperature of an exhaust gas stream from the engine and computing the mass ratio based on said temperature. The fuel contains greater than 90% hydrogen, on a mass basis. The mass ratio is adjusted depending on the composition of the fuel, composition of the oxidizer, and an exhaust gas recirculation amount. The temperature may be determined by a thermocouple, a thermistor, a thermopile, an optical measuring device, or any combination these temperature measuring devices.

An advantage of the present invention is that the mass ratio is determined independently of engine rpm and torque.

An advantage of the present invention is a reliable, unbiased measure of fuel-to air ratio in a hydrogen-fueled engine. Basing the measure of fuel-to-air ratio on temperature overcomes the problem of signal bias of EGO and UEGO sensors.

A further advantage is that robust, inexpensive, well-developed temperature measuring hardware can be used to determine air-fuel ratio in a hydrogen-fueled engine.

Yet another advantage of the present invention is that if a UEGO sensor is provided in the engine's exhaust, the fuel-to-air ratio, as determined by the present invention, can be compared with that determined by the UEGO. These two measures can be used to determine a fault in either the temperature measuring device or the UEGO. Alternatively, the two measures can be used to update calibration constants within the engine computer to refine the computed fuel-to-air ratio determination.

Other advantages, as well as objects and features of the present invention, will become apparent to the reader of this specification.

BRIEF DESCRIPTION OF DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 1:
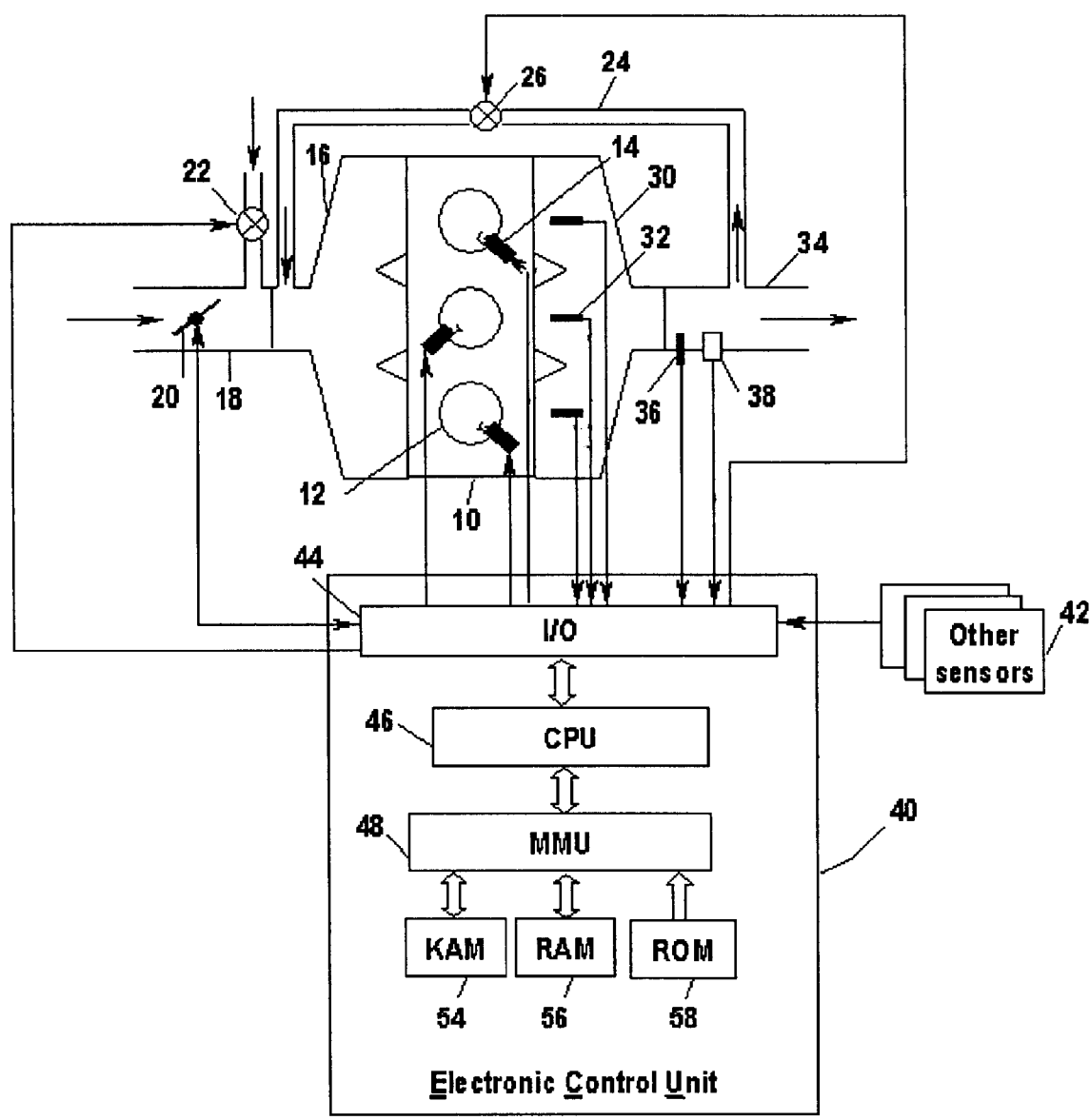
FIG. 1 is a schematic diagram of a hydrogen-fueled engine.

Referring to FIG. 1, an internal combustion engine 10 in shown, with a plurality of, here for purposes of understanding, three cylinders 12 and a spark plug 14 in each cylinder. Engine 10 is provided air through intake duct 18. Air delivery is adjusted by controlling the position of throttle valve 20. Fuel is introduced upstream of intake manifold 10 with delivery rate controlled by valve 22, shown by way of example. Alternatively, fuel is introduced into each runner of intake manifold 16 or directly delivered into cylinders 12 by fuel injectors. Exhaust products are discharged from the engine through an engine exhaust, which is comprised of exhaust manifold 30 and exhaust duct 34. Temperature sensors 32 are installed along each runner of exhaust manifold 30. A temperature sensor 36 is installed in exhaust duct 34. Sensors 32 provide individual cylinder temperature information, which can be used to detect cylinder-to-cylinder differences, whereas sensor 36 provides a measure characteristic of engine 10 as a whole.

Engine 10 is equipped with an exhaust gas recirculation (EGR) system 24, which connects the engine exhaust with the engine intake via a valve 26 for adjusting the quantity of EGR. Engine 10 is shown containing an exhaust gas component sensor 36, an EGO or UEGO sensor, by way of example.

Temperature sensors 32 and 36 are here, for example, thermocouples, thermistors, optical detectors, or any other temperature measuring device suitable for installation in an exhaust duct and capable of measuring temperatures in the range of ambient to 1000° C.

Continuing to refer to FIG. 1, an electronic control unit (ECU) 40 is provided to control engine 10. ECU 4 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 58, random-access memory (RAM) 56, and keep-alive memory (KAM) 54, for example. KAM 54 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which engine 1 is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are fuel injection timing, fuel injection rate, fuel injection duration, throttle valve 20 position, timing of spark plug 14 firing, position of a valve in the EGR system 24, and others. Sensors 42 communicating input through I/O interface 52 indicate engine speed, vehicle speed, coolant temperature, manifold pressure, pedal position, throttle valve 20 position, air temperature, exhaust temperature, and mass air flow rate. Some ECU 40 architectures do not contain MMU 48. If no MMU 48 is employed, CPU 46 manages data and connects directly to ROM 58, RAM 56, and KAM 54. Of course, the present invention could utilize more than one CPU 46 to provide engine control and ECU 40 may contain multiple ROM 58, RAM 56, and KAM 54 coupled to MMU 48 or CPU 46 depending upon the particular application.

Figure 2:
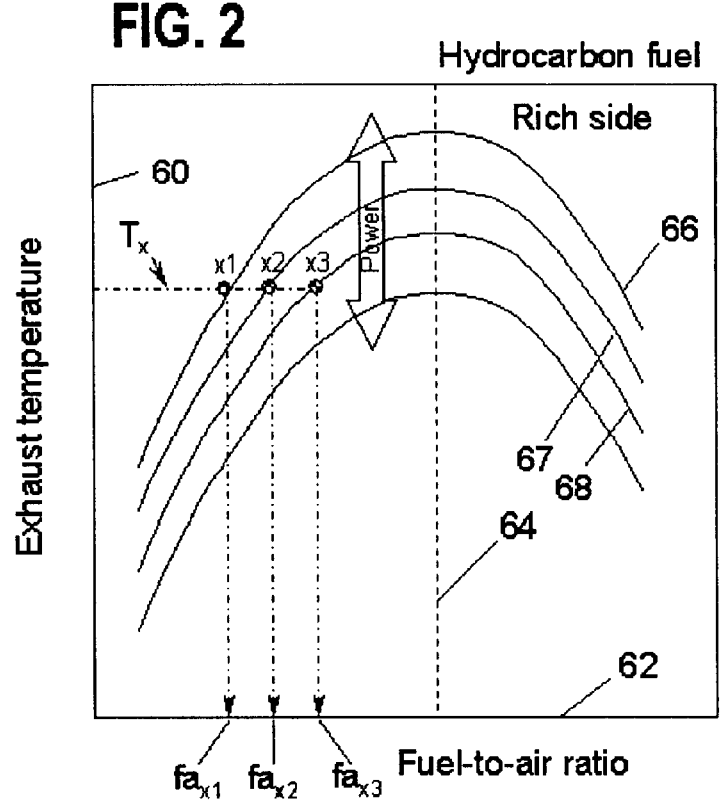
FIG. 2 is a graph of exhaust temperature as a function of fuel-to-air ratio as a result of combustion of hydrocarbon fuel in an internal combustion engine.

A typical relationship between exhaust temperature 60, as measured by sensor 36, and fuel-to-air ratio 62 is shown in FIG. 2 for hydrocarbon fuels, such as gasoline, methane, diesel fuel, etc. At a stoichiometric ratio, (dashed line 64 in FIG. 2) exhaust temperature 60 is at a peak, or nearly so. Exhaust temperature 60 decreases as the mixture is enleaned or enrichened from the peak. As FIG. 2 indicates, exhaust temperature 60 also strongly depends on engine power. Exhaust temperature alone cannot be used to determine fuel-to-air ratio. As an example, in FIG. 2, $T_x$ intersects curve 66 at point x1, curve 67 at point x2, and curve 68 at point x3. Curves 66, 67, and 68 are indicative of different power levels. From points x1, x2, and x3, vertical lines are drawn to intersect the abscissa at $fa_{x1}$, $fa_{x2}$, and $fa_{x3}$. Consequently, unless power level is also known, temperature alone does not uniquely determine fuel-to-air ratio. Instead, $T_x$ yields a multiplicity of values for fuel-to-air ratio, of which $fa_{x1}$, $fa_{x2}$, and $fa_{x3}$ are just three examples.

Figure 3:
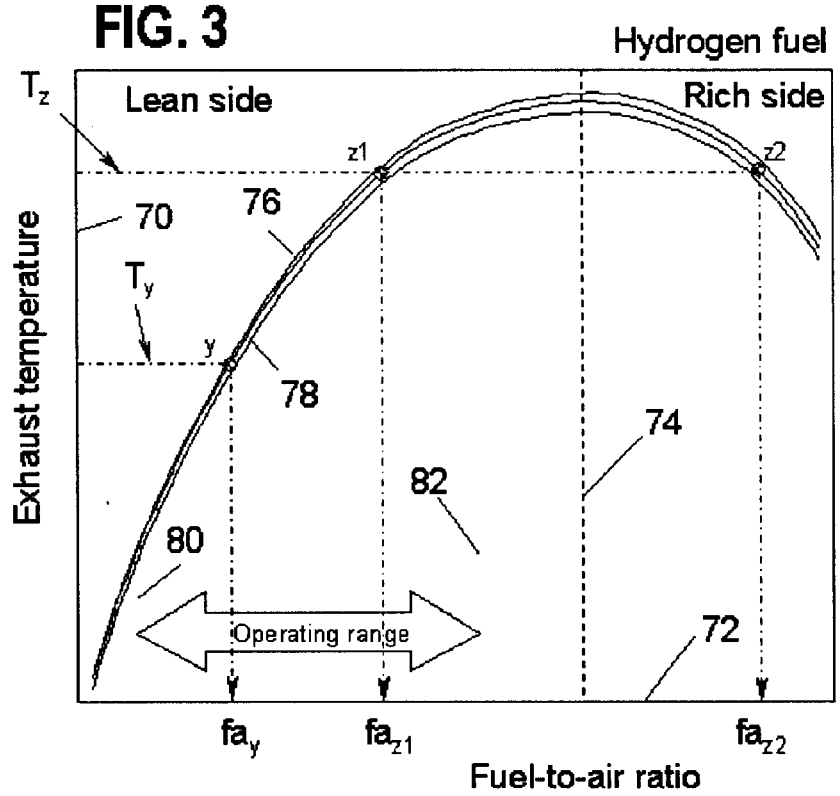
FIG. 3 is a graph of exhaust temperature as a function of fuel-to-air ratio as a result of combustion of hydrogen fuel in an internal combustion engine.

If data similar to those collected to develop FIG. 2 are collected for a hydrogen fueled engine, the results appear in FIG. 3, with exhaust temperature 70, as measured by sensor 36, as the ordinate and fuel-to-air ratio 72 as the abscissa. The stoichiometric fuel-to-air ratio is indicated by dashed line 74, which yields approximately the highest exhaust temperature. The significant difference between the results in FIG. 2 for hydrocarbon fuel and the results in FIG. 3 for hydrogen fuel is that with the latter, the exhaust temperature only weakly depends on engine power. Thus, curves 76 at high power and 78 at low power are nearly coincident.

Temperature $T_y$ intersects curves 76 and 78 at approximately point y, indicating a fuel-to-air ratio of $fa_y$. The significant point being that it yields a single value of fuel-to-air ratio independent of engine power. Power is related to the product of speed and torque. Thus, either a change in torque or speed causes a change in power.

In FIG. 3, temperature $T_z$ intersects curves 76 and 78 at points z1 and z2, one on the lean side and one on the rich side of stoichiometric, respectively. This potential confusion is not a practical limitation of the present method because, in practice, when combusting hydrogen fuel, the normal fuel-to-air ratio operating range is between about 0.2–0.8 of the stoichiometric fuel-to-air ratio, which is indicated in FIG. 3 as the operating range between dotted lines 80 and 82. The fuel efficiency advantage of hydrogen fuel disappears when the fuel-to-air ratio approaches a stoichiometric proportion. Furthermore, undesirable uncontrolled, auto-ignition of hydrogen occurs at air-to-fuel ratios approaching stoichiometric. For these reasons, operation is typically limited to a fuel-to-air ratio below about 0.8 of the stoichiometric fuel-to-air ratio.

Air is the oxidant in the examples discussed above. However, the present invention applies to other oxidizers, such as oxygen-enriched air. The fuel of FIG. 3 is hydrogen. As long as the fuel is predominantly hydrogen, i.e., less than about 10% hydrocarbons by mass, the present invention can be used to advantage. The effect of the hydrocarbon impurity is to cause curves 76 and 78 of FIG. 3, to diverge, thus diminishing the accuracy of the measurement of fuel-to-air ratio according to the present invention.

There is an assumption implicit in FIGS. 2 and 3 concerning the phasing of the combustion event (with respect to engine rotation angle). Timing, or phasing, of the combustion event significantly affects the amount of power developed by the engine as well as exhaust temperature. In spark ignition engines, optimally phased timing, with respect to producing the highest torque, is called MBT timing, where MBT refers to minimum spark advance for best torque. Analogously, in-cylinder conditions are controlled to cause the engine to produce the highest torque in homogeneous-charge, compression-ignition engines. Implicit in FIGS. 2 and 3 is that the ignition timing is controlled to provide the highest torque. Alternatively, FIGS. 2 and 3 apply to ignition timing being retarded proportionally from MBT timing. A set of curves that depend on ignition timing can be developed to account for the effect of ignition timing. Alternatively, the curve of FIG. 3 is corrected based on ignition timing or the corresponding data are stored in a lookup table in the ECU 40.

Implicit in FIGS. 2 and 3 is that there is no exhaust gas recirculation (EGR). However, it is known to those skilled in the art that because EGR is a combustion diluent, it causes a diminution of exhaust temperature. As with the effect of ignition timing on exhaust temperature, the method, according to the present invention, can be adapted to correct for EGR content.

In the foregoing discussion, the term air-fuel ratio is used since air is the common oxidizer for combustion systems. If another oxidizer, such as oxygen-enriched air, were used, the method described herein also applies. However, the curves in FIGS. 2 and 3 depend on the oxidizer type. To adapt the present invention for other oxidizers, a correction factor for the oxidizer type is employed.

The measure of fuel-to-air ratio, according to the present invention, is typically used by the ECU 4 to provided a feedback signal for performing feedback control of fuel-to-air ratio in at least two modes: firstly, it can be used to provide a desired fuel-to air ratio, and secondly, it can be used to ensure that the fuel-to-air ratio is within desired operating range, which is a range of about 0.2–0.8 of the stoichiometric fuel-to-air ratio.

As discussed above, in one embodiment, a UEGO sensor 38 is installed in engine exhaust 34. In this alternative, air-to-fuel ratio may be computed based on a signal from temperature sensor 36 and a signal from UEGO sensor 38. Based on the two signals, it can be determined if one of the sensors has a fault condition. Alternatively, the two signals can be used to improve the precision of the measurement. Specifically, the calibration constants in ECU 40 can be updated to reflect the additional information that the two signals provide.

While several examples for carrying out the invention have been described, those familiar with the art to which this invention relates will recognize alternative designs and embodiments for practicing the invention. Thus, the above-described embodiments are intended to be illustrative of the invention, which may be modified within the scope of the following claims.

What is claimed is:

1. A method, comprising:
    combusting a fuel comprising hydrogen with an oxidizer in an internal combustion engine producing an exhaust gas stream, said exhaust gas stream being discharged from the engine;
    determining the temperature of the exhaust gas stream; and
    determining the mass ratio of fuel fed to the engine to oxidizer fed to the engine based on said determined temperature independent of engine operating power.

2. The method of claim 1, wherein said fuel contains greater than 90% hydrogen on a mass basis.

3. The method of claim 1 wherein, said oxidizer is air.

4. The method of claim 1, further comprising adjusting the mass ratio based on the composition of the oxidizer.

5. The method of claim 1, wherein the engine has at least one cylinder and a spark plug is disposed in each cylinder, further comprising:
    determining the minimum spark advance for best torque spark timing; and
    basing a spark timing to command to said spark plugs on said minimum spark advance for best torque.

6. The method of claim 5, further comprising the step of adjusting the mass ratio based on said spark timing relative to said minimum spark advance for best torque spark timing.

7. The method of claim 1, wherein the engine has an exhaust gas recirculation system connecting an exhaust of the engine to an intake of the engine, the method further comprising the step of adjusting the mass ratio based on a quantity of exhaust gases recirculated to the intake of the engine.

8. The method of claim 1, further comprising:
    comparing the mass ratio to a predetermined minimum mass ratio and a predetermined maximum mass ratio;
    causing the mass ratio to increase when the mass ratio is less than said predetermined minimum mass ratio; and
    causing the mass ratio to decrease when the mass ratio is greater than said predetermined maximum mass ratio.

9. A method, comprising:
    introducing hydrogen into an internal combustion engine along with an oxidizer;
    determining a mass ratio of the hydrogen to the oxidizer when the mass ratio is less than a stoichiometric mass ratio, the hydrogen and the oxidizer being combusted in the internal combustion engine with products of such combustion being removed from the engine as an exhaust gas stream;

determining a temperature of the exhaust gas stream; and computing the mass ratio based on said temperature independent of engine operating power.

10. The method of claim 9, wherein the engine has an exhaust gas recirculation system which connects an engine exhaust to an engine intake via an exhaust gas recirculation valve, further comprising:

correcting the mass ratio based on a quantity of exhaust gases recirculated through said exhaust gas recirculation system; and correcting the mass ratio based on a start time of combustion.

11. The method of claim 9, further comprising:

determining a desired fuel-to-air mass ratio;

computing an error mass ratio based on a difference between said desired fuel-to air mass ratio and the mass ratio; and controlling delivery of air to the engine based on said error.

12. A system for determining a hydrogen fuel to air mass ratio when the mass ratio is less than a stoichiometric mass ratio, the hydrogen fuel and air being combusted in an internal combustion engine, comprising:

at least one temperature measuring device disposed in an exhaust coupled to the engine, said device providing a signal indicating a temperature of an exhaust gas stream discharged from the engine; and an electronic control unit operably connected to the engine and said temperature measuring device, said electronic control unit determining the mass ratio based on said signal from said temperature measuring device.

13. The system of claim 12, wherein said exhaust comprises an exhaust manifold and an exhaust duct coupled downstream of said exhaust manifold and said temperature measuring device is disposed in said exhaust duct.

14. The system of claim 12, wherein the engine has at least one cylinder, said exhaust comprises an exhaust duct and an exhaust manifold which further comprises an exhaust runner for each of said cylinders, said temperature measuring device is disposed in each of said exhaust runners, said signals from each of said temperature measuring devices indicates the mass ratio of its corresponding cylinder.

15. The system of claim 14, wherein said electronic control unit adjusts an amount of fuel delivered to a particular cylinder based on the mass ratio indicated in said particular cylinder.

16. The system of claim 12, wherein said temperature sensor is one of a thermocouple, a thermopile, a thermistor, and an optical temperature measuring device.

17. The system of claim 12, further comprising:

an intake coupled to the engine, a hydrogen supply duct coupled to said intake; and a hydrogen valve disposed in said hydrogen supply duct operably connected to said electronic control unit, wherein apposition of said hydrogen valve is feedback controlled to provide a desired torque from the engine.

18. The system of claim 17, further comprising a throttle valve disposed in said intake operably connected to said electronic control unit wherein a position of said throttle valve is feedback controlled to provide a desired mass ratio in said exhaust gas stream.

19. The system of claim 12, further comprising:

an intake coupled to the engine; and a throttle valve disposed in said intake operably connected to said electronic control unit, wherein a position of said throttle valve is feedback controlled to provide a desired torque from the engine.

20. The system of claim 19, further comprising:

a hydrogen supply duct coupled to said intake; and a hydrogen valve disposed in said hydrogen supply duct operably connected to said electronic control unit, wherein a position of said hydrogen valve is feedback controlled to provide a desired mass ratio in said exhaust gas stream.

21. The system of claim 20, wherein said desired mass ratio is between a minimum mass ratio of about 0.2 of said stoichiometric mass ratio and a maximum mass ratio of about 0.8 of said stoichiometric mass ratio.

22. A system for determining a first mass ratio of hydrogen fuel to air when the first mass ratio is less than a stoichiometric mass ratio, the hydrogen fuel and air being combusted in an internal combustion engine, comprising:

at least one temperature measuring device disposed in an exhaust coupled to the engine, said device providing a signal indicating a temperature of an exhaust gas stream discharged from the engine; and an electronic control unit operably connected to the engine and said temperature measuring device, said electronic control unit determining the first mass ratio based on said signal from said temperature measuring device independent of engine operating torque or speed.

23. The system of claim 22, wherein said exhaust comprises an exhaust manifold and an exhaust duct coupled downstream of said exhaust manifold and said temperature measuring device is disposed in said exhaust duct.

24. The system of claim 22, wherein the engine has at least one cylinder, said exhaust comprises an exhaust duct and an exhaust manifold which further comprises an exhaust runner for each of said cylinders, said temperature measuring device is disposed in each of said exhaust runners, said signals from each of said temperature measuring devices indicates the first mass ratio of its corresponding cylinder.

25. The system of claim 24, wherein said electronic control unit adjusts an amount of fuel delivered to a particular cylinder based on the first mass ratio indicated in said particular cylinder.

26. The system of claim 22, wherein said temperature sensor is one of a thermocouple, a thermopile, a thermistor, and an optical temperature measuring device.

27. The system of claim 22, further comprising:

an intake coupled to the engine, a hydrogen supply duct coupled to said intake; and a hydrogen valve disposed in said hydrogen supply duct operably connected to said electronic control unit, wherein a position of said hydrogen valve is feedback controlled to provide a desired torque from the engine.

28. The system of claim 27, further comprising a throttle valve disposed in said intake operably connected to said electronic control unit wherein a position of said throttle valve is feedback controlled to provide a desired mass ratio in said exhaust gas stream.

29. The system of claim 22, further comprising:

an intake coupled to the engine; and a throttle valve disposed in said intake operably connected to said electronic control unit, wherein a position of said throttle valve is feedback controlled to provide a desired torque from the engine.

30. The system of claim 29, further comprising:

a hydrogen supply duct coupled to said intake; and a hydrogen valve disposed in said hydrogen supply duct operably connected to said electronic control unit, wherein a position of said hydrogen valve is feedback controlled to provide a desired mass ratio in said exhaust gas stream.

31. The system of claim 30, wherein said desired mass ratio is between a minimum mass ratio of about 0.2 of said stoichiometric mass ratio and a maximum mass ratio of about 0.8 of said stoichiometric mass ratio.

32. The system of claim 22, further comprising a universal exhaust gas oxygen sensor disposed in said engine exhaust and coupled to said electronic control unit wherein a second mass ratio is determined based on a signal from said universal exhaust gas oxygen sensor.

33. The system of claim 32, wherein said electronic control unit compares said first and second mass ratios and determines whether a fault condition has occurred in one of said universal exhaust gas oxygen sensor and said temperature sensor based on said comparison.

34. The system of claim 32, wherein said electronic control unit compares said first and second mass ratios and updates a calibration constant within said electronic control based on said comparison.

* * * * *